US011840810B2

(12) United States Patent
Rife et al.

(10) Patent No.: US 11,840,810 B2
(45) Date of Patent: Dec. 12, 2023

(54) TRACKING THE ENVIRONMENT AROUND A MACHINE TO DEFINE ACTUAL CUT PROFILE

(71) Applicant: Caterpillar Paving Products Inc., Brooklyn Park, MN (US)

(72) Inventors: Conwell K Rife, Plymouth, MN (US); Eric Steven Engelmann, Delano, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 89 days.

(21) Appl. No.: 17/514,889

(22) Filed: Oct. 29, 2021

(65) Prior Publication Data

US 2023/0138075 A1     May 4, 2023

(51) Int. Cl.
*E01C 23/088* (2006.01)
*E01C 23/12* (2006.01)
*E01C 23/01* (2006.01)
*G01B 11/24* (2006.01)

(52) U.S. Cl.
CPC .......... *E01C 23/088* (2013.01); *E01C 23/127* (2013.01); *E01C 23/01* (2013.01); *G01B 11/24* (2013.01)

(58) Field of Classification Search
CPC ...... E01C 23/01; E01C 23/088; E01C 23/127; G01B 11/24; G01B 15/04; G01B 17/06; G01B 21/20
See application file for complete search history.

(56) References Cited

U.S. PATENT DOCUMENTS

| 9,121,146 | B2 | 9/2015 | Paulsen et al. | |
| 10,704,213 | B2 | 7/2020 | Gerhardy et al. | |
| 10,775,796 | B2 | 9/2020 | Newlin et al. | |
| 10,776,638 | B2 | 9/2020 | Engelmann | |
| 10,794,101 | B2 | 10/2020 | Preising, Jr. | |
| 10,829,899 | B2 | 11/2020 | Sturos | |
| 2013/0128279 | A1* | 5/2013 | Wachsmann | E01C 23/01 356/601 |
| 2014/0097665 | A1* | 4/2014 | Paulsen | E01C 23/088 356/601 |
| 2016/0348324 | A1* | 12/2016 | Engelmann | E01C 23/127 |
| 2020/0032464 | A1 | 1/2020 | O'Donnell | |
| 2020/0114909 | A1 | 4/2020 | Shelton et al. | |
| 2021/0148067 | A1* | 5/2021 | Wagner | E01C 23/127 |
| 2021/0189667 | A1* | 6/2021 | Fritz | E01C 19/004 |

FOREIGN PATENT DOCUMENTS

| EP | 2558643 A2 | 2/2013 |
| EP | 3795748 A1 | 3/2021 |

* cited by examiner

*Primary Examiner* — Abby J Flynn
*Assistant Examiner* — Michael A Goodwin
(74) *Attorney, Agent, or Firm* — Lee & Hayes, P.C.

(57) ABSTRACT

When removing portions of a work surface at a worksite with a machine (e.g., such as a cold planer), is useful to know the actual cut depths on each edge of the cold planer and/or the volume of material that has been removed from a work surface. However, determining actual cut depths and/or volume removed is difficult, costly, and can be inaccurate, resulting in increased costs and inefficiencies at the worksite. Accordingly, the present disclosure describes systems and methods for enabling automatic control of cut depth of a machine via a machine-controlled feedback loop and improved determinations of actual volume of material removed by the machine.

19 Claims, 6 Drawing Sheets

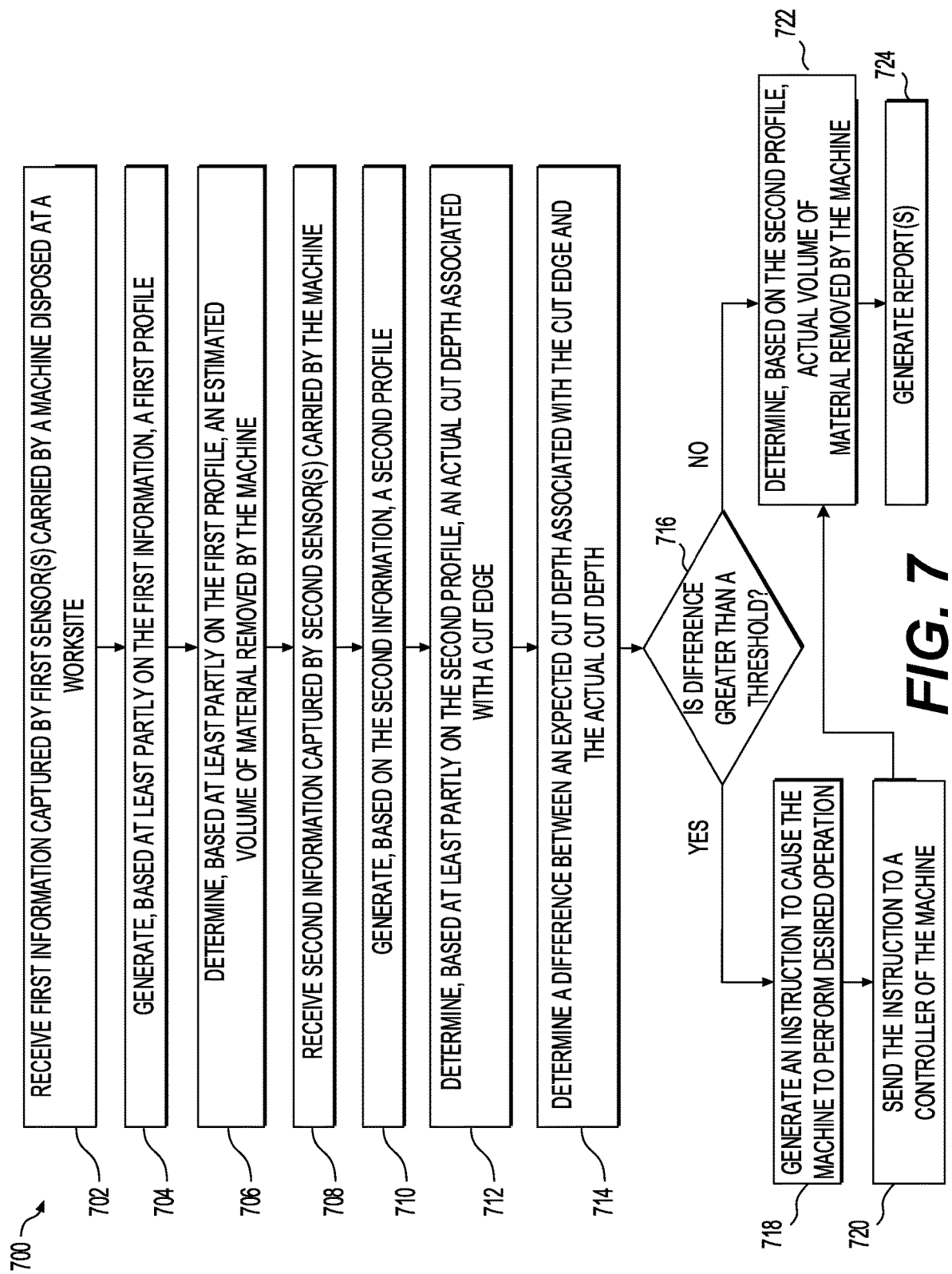

TRACKING THE ENVIRONMENT AROUND A MACHINE TO DEFINE ACTUAL CUT PROFILE

TECHNICAL FIELD

The present disclosure is related to defining an actual cut profile for a machine. More specifically, the present disclosure relates to systems and methods for generating cut profiles and providing near real-time controls to the machine via a machine-controlled feedback loop. Additionally, the present disclosure relates to systems and methods of determining the actual volume of material removed at a worksite.

BACKGROUND

At a paving worksite, one or more pieces of paving equipment, such as a cold planer, can be used to remove a portion of a roadway, parking lot, or other such work surface in order to expose a paving surface. Once the portion of the work surface has been removed, a paving machine, such as an asphalt paver, may distribute, profile, and partially compact heated paving material (e.g., asphalt) onto the paving surface. One or more compaction machines may then be used to further compact the paving material until a desired paving material density has been reached.

While removing portions of the work surface with the cold planer, it may be useful to know the actual cut depths on each edge of the cold planer, in order to determine whether the machine is cutting too shallow and/or too deep. However, determining actual cut depths often requires personnel at the worksite to manually measure the cut depths for each side of the machine. If the cut depths are outside of a desired range, a cold planer operator may adjust various settings on the cold planer in order to achieve the desired cut depth. Not only is this process potentially dangerous for the worksite personnel, but this process also causes delays and inefficiencies at the worksite, resulting in increased costs.

Additionally, it can be useful to know the volume or tonnage of material that has been milled and/or removed from a work surface in order to coordinate the delivery of asphalt to the worksite. However, determining volume removed can be difficult, and estimates of such volumes are often inaccurate. This results in increased costs and inefficiencies at the worksite.

An example system for determining milled volume or milled area of a milled surface is described in U.S. Pat. No. 9,121,146 (hereinafter referred to as the '146 reference). For instance, the '146 reference describes a process for determining a volume of material milled as a function of a cross-sectional area of material to be milled in front of the milling drum and a distance traveled by the construction machine while actively milling. As explained in the '146 reference, the cross-sectional area is determined in part by direct machine observation of one or more profile characteristics of a ground surface in front of the milling drum. Additionally, the '146 reference describes that the surface area milled is determined as a function of the width of the area to be milled in front of the milling drum and a distance traveled by the construction machine while actively milling.

Although the system described in the '146 reference is configured to determine a volume of material milled as a function of a cross-sectional area of material to be milled in front of the milling drum and a distance traveled by the construction machine while actively milling, the system described in the '146 reference is not configured to, for example, measure the actual cut depth at the sides or rear of the machine, generate an actual cut profile for the rear of the machine, or determine an actual volume of material removed by the machine using the actual cut profile. As a result, the system described in the '146 reference may inefficient, inaccurate, and costly.

Example embodiments of the present disclosure are directed toward improving upon the various paving systems described above.

SUMMARY OF THE INVENTION

In an example of the present disclosure, a method includes receiving, by a processor of a computing device and from a controller of a machine disposed at a worksite, via a network, first information captured by one or more first sensors carried by the machine. The processor generates, based at least partly on the first information, a first profile of a work surface in front of the machine and determines, based at least partly on the first profile, an estimated volume of material removed from the worksite by the machine. The method further includes receiving, by the processor and from the controller of the machine, via the network, second information captured by one or more second sensors carried by the machine. The processor generates, based at least partly on the second information, a second profile of a cut surface behind a cutting tool of the machine and determines, based at least partly on the second profile, a first actual cut depth associated with a first cut edge of the machine and a second actual cut depth associated with a second cut edge of the machine. The processor determines, a difference between one or more of a first expected cut depth associated with the first cut edge and the first actual cut depth or a second expected cut depth associated with the second cut edge and the second actual cut depth, and generates an instruction configured to cause the machine to perform a desired operation, based at least partly on the difference.

In another example of the present disclosure, a system includes a machine disposed on a work surface of a worksite and configured to remove at least part of the work surface, a first sensor carried by frame of the machine and disposed at a front end of the machine, the first sensor being configured to capture first information indicative of a first profile of a first portion of the work surface proximate the front end of the machine, a second sensor carried by the frame of the machine and disposed at a back end of the machine opposite the front end, the second sensor being configured to capture second information indicative of a second profile of a second portion of the work surface proximate the back end of the machine, the second portion of the work surface comprising a portion that has been acted on by the machine, and a processor operably connected to a display of a device. The processor is configured to receive the first information captured by the first sensor, generate, based at least partly on the first information, the first profile of the first portion of the work surface, determine, based at least partly on the first profile, an estimated volume of material removed from the worksite by the machine, receive the second information from the second sensor, generate, based at least partly on the second information, the second profile of the second portion of the worksite, determine, based at least partly on the second profile, an actual cut depth associated with a cut edge of the machine, determine a difference between an expected cut depth associated with the cut edge and the actual cut depth, and generate an instruction configured to cause the machine to perform a desired operation, based at least partly on the difference.

In yet another example of the present disclosure, one or more non-transitory computer-readable storage media storing instructions that, when executed by a processor, cause the processor to perform acts comprising receiving, via a network, first information captured by one or more first sensors carried by a machine disposed at a worksite, generating, based at least partly on the first information, a first profile of a work surface in front of the machine, determining, based at least partly on the first profile, an estimated volume of material removed from the worksite by the machine, receiving, via the network, second information captured by one or more second sensors carried by the machine, generating, based at least partly on the second information, a second profile of a cut surface behind a cutting tool of the machine, determining, based at least partly on the second profile, an actual cut depth associated with a cut edge of the machine, determining a difference between an expected cut depth associated with the cut edge and the actual cut depth, and generating, by the processor, an instruction configured to cause the machine to perform a desired operation, based at least partly on the difference.

BRIEF DESCRIPTION OF THE DRAWINGS

FIG. 7 is a flow chart depicting an example method associated with the system shown in FIG. 1.

DETAILED DESCRIPTION

Figure 1:
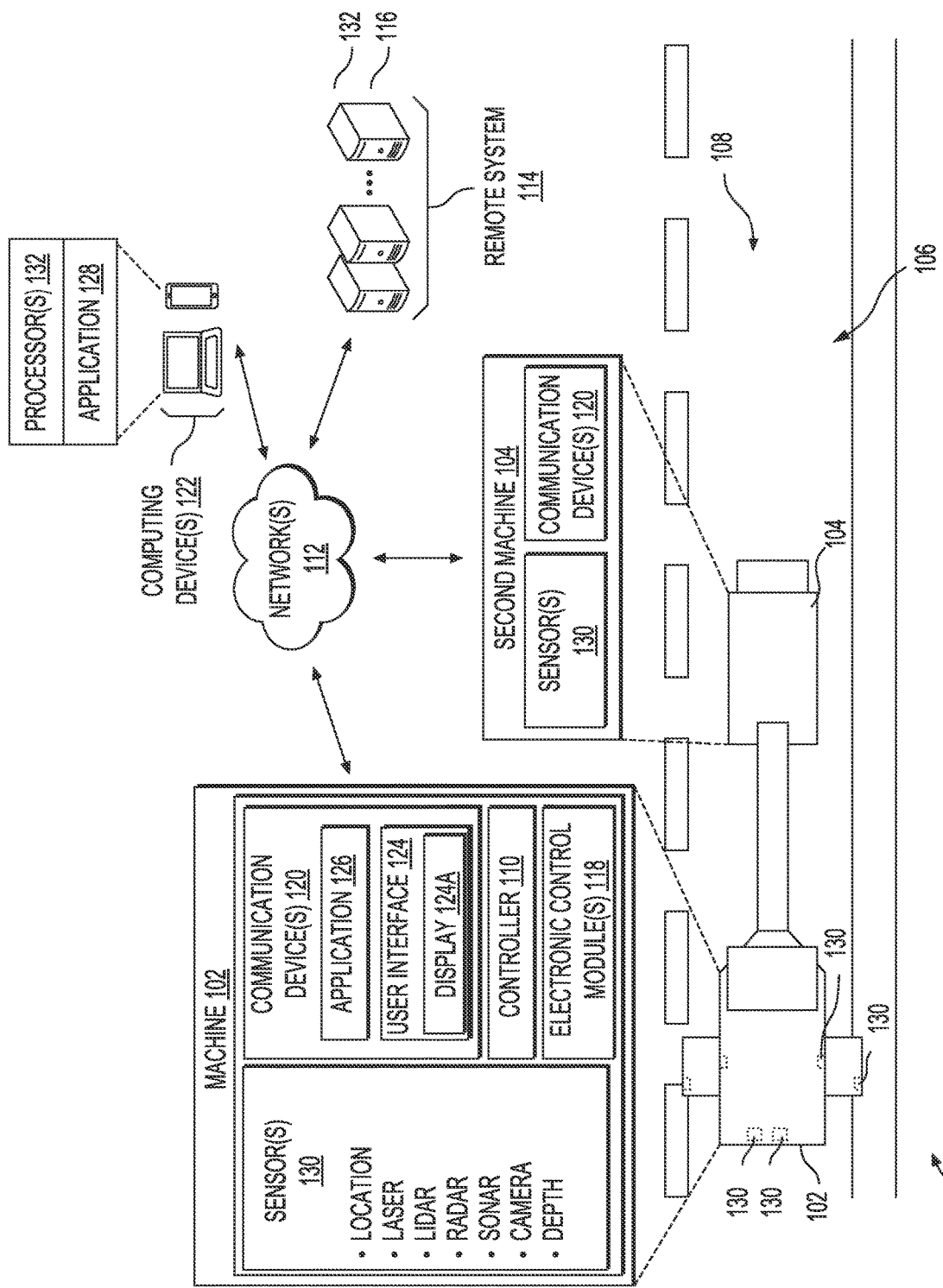
FIG. 1 is a schematic illustration of a system in accordance with an example of the present disclosure. The example system shown in FIG. 1 includes a cold planer and a hauling machine.

Wherever possible, the same reference numbers will be used throughout the drawings to refer to the same or like parts. Referring to FIG. 1, an example system 100 includes one or more machine(s), such as machine 102 and second machine 104, moveable along a work surface 106 of a worksite 108 to perform various tasks at the worksite 108. The example system 100 includes at least one example machine 102 configured for use in one or more excavating, hauling, compacting, paving, or other such processes. The machine 102 is illustrated as a cold planer 102 which may be used, for example, for road or highway constructions, and other allied industries. Alternatively, the machine 102 may be any other machine used for depositing asphalt, concrete, or like materials. The second machine 104 is illustrated as a hauling machine 104. A hauling machine 104 refers to any machine that carries the excavated materials between different locations within worksite 108. Examples of hauling machines 104 include an articulated truck, an off-highway truck, an on-highway dump truck, and a wheel tractor scraper, among other types of hauling machines 104. Laden hauling machines 104 carry overburden from areas of excavation within worksite 108, along haul roads to various dump sites, and return to the same or different excavation areas to be loaded again. Under normal conditions, similar co-located hauling machines 104 perform about the same with respect to productivity and efficiency when exposed to similar site conditions.

Each of the machines described herein includes a frame, one or more engines (e.g., diesel engines), battery packs, fuel cells, or other power sources supported by the frame and configured to drive and/or otherwise provide power to various components of the machines, and a display operably connected to a controller 110. In such examples, a power source of a particular machine may provide power to drive movement of the machine along the work surface 106 of the worksite 108. Such power sources may also provide power to energize, drive, activate, and/or otherwise operate various parasitic loads (e.g., hydraulic cylinders/systems, cooling systems, electronic systems, pneumatic systems, etc.) of the machine. Each of the machines described herein are in communication with each other and/or with a local or remote system 114 by way of a network 112. The remote system 114 is remotely located from the worksite 108.

The network 112 comprises a local area network ("LAN"), a WiFi direct network, wireless LAN ("WLAN"), a larger network such as a wide area network ("WAN"), or a collection of networks, such as the Internet. Protocols for network communication, such as TCP/IP, are used to implement the network 112. Although embodiments are described herein as using a network 112 such as the Internet, other distribution techniques may be implemented that transmit information via memory cards, flash memory, or other portable memory devices. The network 112 facilitates wireless communication between the machines described herein and/or between controllers 110 of such machines and, for example, a system controller 116 and/or processor(s) 132 of the remote system 114, for the purpose of transmitting and/or receiving operational data.

The system controller 116 and/or the controllers 110 may be an electronic controller that operates in a logical fashion to perform operations, execute control algorithms, store and retrieve data, and other desired operations. The system controller 116 and controllers 110 include and/or access memory, secondary storage devices, processors, and any other components for running an application. The memory and secondary storage devices can be in the form of read-only memory (ROM) or random-access memory (RAM) or integrated circuitry that is accessible by the controller. Various other circuits are associated with the system controller 116 and controllers 110 such as power supply circuitry, signal conditioning circuitry, driver circuitry, and other types of circuitry.

The system controller 116 and/or a controller 110 is a single controller or includes more than one controller. As used herein, the term "controller" is meant in its broadest sense to include one or more controllers, processors, central processing units, and/or microprocessors that are associated with the system 100, and that may cooperate in controlling various functions and operations of the machines included in the system 100. The functionality of the system controller 116 and/or the controllers 110 are implemented in hardware and/or software without regard to the functionality. The system controller 116 and/or the controllers 110 may rely on one or more data maps, look-up tables, neural networks, algorithms, machine learning algorithms, and/or other components relating to the operating conditions and the operating environment of the system 100 that may be stored in the memory of the system controller 116 and/or the memory of controllers 110. Each of the data maps, look-up tables, neural networks, and/or other components noted above includes a collection of data in the form of tables, graphs, and/or equations to maximize the performance and efficiency of the system 100 and its operation. As will be described in greater detail below, the controllers 110, system controller 116, and/or processor(s) 132 are configured to receive various types of data (e.g., worksite data, operations data, raw sensor data, sensor data, etc.) from a controller 110 of the machine 102, generate cut profiles using the data, provide near real-time controls to the machine 102 via a machine-controlled feedback loop, and determine the actual volume of material removed at a worksite 108.

The machine 102 also includes one or more ECU(s) 118 such as, for example, an electronic control module (ECM), a powertrain control module (PCM), a transmission control module (TCM), a brake control module (EBCM), a central control module (CCM), a central timing module (CTM), a general electronic module (GEM), a body control module (BCM), a suspension control module (SCM), and a control unit, among other types of ECUs. The ECU(s) 118 include hardware and embedded software that assist in the operation of the machines 102, 104. In some examples, the ECU(s) 118 are included as part of controller 110.

Communication devices 120 are operably connected to a controller 110 and communicatively connected to network 112. In some examples, communication devices 120 are configured to permit wireless transmission of a plurality of signals and/or information between controllers 110 and system controller 116. Such communication devices 120 may also be configured to permit communication with other machines and systems remote from the worksite 108. For example, such communication devices 120 includes a transmitter configured to transmit signals (e.g., over the network 112) to a receiver of one or more other such communication devices 120. In such examples, each communication device 120 may also include a receiver configured to receive such signals (e.g., over the network 112). In some examples, the transmitter and the receiver of a particular communication device 120 is combined as a transceiver or other such component. In any of the examples described herein, the respective controllers 110 of the machines 102, 104, and/or other machines of the system 100 are substantially similar to and/or the same as the system controller 116, and includes one or more of the same components thereof.

In any of the examples described herein, the communication devices 120 also enable communication (e.g., over the network 112) with computing device(s) 122. The communication device 120 may also be configured to permit wireless transmission of a plurality of signals, instructions, and/or information between the machine 102 and one or more servers, processors, computers, one or more tablets, computers, cellular/wireless telephones, personal digital assistants, mobile devices, computing devices 122, or other electronic devices, and/or other components of a remote system 114. Such a remote system 114 may be located at the worksite 108. Alternatively, one or more components of the remote system 114 may be located remote from the worksite (e.g., at a back office). It is understood that the remote system 114, and its respective components, may be part of and/or otherwise included in the system 100. In some examples, the communication device 120 comprises a user interface 124 that includes a display 124A that displays information to an operator of the machine 102. The user interface 124 is operatively coupled to the controller 110 and/or application 126.

Computing device 122 comprises one or more tablets, computers, cellular/wireless telephones, personal digital assistants, mobile devices, or other electronic devices located at the worksite 108 and/or remote from the worksite 108. Computing device 122 comprises one or more processor(s) 132 that include and/or access memory, secondary storage devices, and any other components for running an application. The memory and secondary storage devices can be in the form of read-only memory (ROM) or random-access memory (RAM) or integrated circuitry that is accessible by the processor(s) 132. In some examples, computing device 122 comprises a mobile phone and/or tablet of worksite personnel (e.g., project managers, foremen, supervisors, etc.) overseeing daily operations at the worksite 108. For example, the computing device 122 stores worksite data associated with the worksite in a datastore. The worksite data includes information about a first planned depth of cut in a first area of the worksite (e.g., cut a road surface to a first depth) and a second planned depth of cut in a second area of the worksite (e.g., cut an intersection of two roads to a second depth). Accordingly, an application 128 on computing device 122 communicates with machine 102 in order to generate actual cut profiles based on sensor information from sensor(s) 130 of the machine 102 and/or sensor(s) 130 of the second machine 104.

As illustrated in FIG. 1, the example machine 102 includes one or more sensor(s) 130 that are carried by and/or mounted to a frame of the machine 102 and configured to capture sensor data in an environment surrounding the machine 102 (e.g., sensors 130 disposed on the machine 102). The sensor(s) 130 may be disposed at one or more locations of the machine 102 (e.g., in front of a cutting drum and/or at the front of the machine 102, behind a cutting drum and/or at the rear of the machine 102, along the sides of the machine 102, and/or any other location on the machine 102). The sensor(s) 130 include lidar sensors, radar sensors, cameras (e.g., red/green/blue (RGB), infrared (IR), intensity, depth, time of flight, etc.), proximity sensors, cut-depth sensors, audio sensors, ultrasonic transducers, sonar sensors, location sensors (e.g., global positioning system (GPS), compass, etc.), inertial sensors (e.g., inertial measurement units, accelerometers, magnetometers, gyroscopes, etc.), environment sensors (e.g., temperature sensors, humidity sensors, light sensors, pressure sensors, etc.), laser scanners, light emitting diode (LED) scanners, 3-D scanners, 2-D scanners, and the like.

In some examples, sensor(s) 130 comprise one or more laser profile scanners (e.g., LPS 36 Laser Measurement System available from Leuze electronic GmbH & Co. KG of Owen, Germany, and/or the LMS100 Laser Measurement System available from Sick, AG of Waldkirch, Germany). In some examples, the sensor(s) 130A and 130B comprise one or more laser scanners, LED scanners, three-dimensional scanners, and/or two-dimensional sensors.

In some examples, the sensor(s) 130 are located on the front, sides, and rear of the machine 102 and configured to detect obstacles, people, etc. In some examples, the sensor(s) 130 also capture data associated with an area around the machine 102 and send the data to processor(s) 132 of a computing device 122. The processor(s) 132 use the data to make a determination if an event (e.g., a potential collision) is about to occur between the machine 102 and an object, personnel, or the like at the worksite 108. For instance, where the processor(s) 132 sensor(s) 130 determine that an event is about to occur, the processor(s) 132 send a desired operation (e.g., a notification, alert, and/or instruction to a controller 110 of the machine 102). For instance, the desired operation can include instructing the machine 102 to stop, causing an alert to be displayed on a user interface 124 of a communication device 120 of the machine 102, among other things. In some examples, the determination of whether an event is about to occur and/or detecting a variety of things at the worksite 108 is performed by a controller 110 of the machine 102, a system controller 116 and/or processor(s) 132 of a remote system 114, and/or off-board processor(s) 132 of a computing device 122.

In some examples, a controller 110 of the machine 102 receives raw sensor data from the sensor(s) 130 of the machine 102. The controller 110 of the machine 102 may send (e.g., using application 126 on communication device 120 and via network 112) the raw sensor data to a processor 132 of a computing device 122. The processor 132 of the computing device 122 processes the raw sensor data (e.g., via image processing, and/or other machine-trained mechanisms) and generates profile(s) for the machine 102. In some examples, the raw sensor data comprises image data from the sensor(s) 130. In some examples, the processor 132 of the computing device 122 generates a first cut profile of the machine 102 based on sensor data received from sensor(s) 130 located in a front portion of the machine 102. For instance, where machine 102 comprises a cold planer 102, the first cut profile generated by the processor(s) 132 is based on sensor data received from sensor(s) located in front of a cutting drum (e.g., milling drum) of the cold planer 102. The processor 132 of the computing device 122 also generates a second cut profile based on sensor data received from sensor(s) located on a back portion of the machine 102. For instance, where machine 102 comprises the cold planer 102, the processor 132 of the computing device 122 generates a second cut profile corresponding to an actual cut profile for an area behind the cutting drum of the cold planer 102. In some examples, the actual cut profile includes a substantially vertical cut edge defining a cut depth, and a substantially horizontal cut width, where the cut edge and the cut width are formed on the work surface by the cutting tool of the machine.

In some examples, processor(s) 132 of the computing device 122 use the generated cut profile(s) to perform one or more desired operations. For instance, the processor 132 of the computing device 122 determines an estimated volume removed based on the first cut profile of the machine 102. The processor 132 of the computing device 122 can also determine an actual volume removed using the second cut profile (e.g., actual cut profile) of the machine 102. By combining the first cut profile and the second cut profile, the processor 132 of the computing device 122 can determine a more accurate actual volume of material removed from the worksite 108 by the machine 102. Additionally, the processor 132 of the computing device 122 determines, based on the actual cut profile, whether to generate and send one or more instruction(s), alert(s), notification(s), etc., to the controller 110 of the machine 102. In some examples, the instruction(s), alert(s), notification(s), etc., cause, when executed by the controller 110 of the machine 102, the controller 110 to perform one or more desired operations (e.g., adjust one or more components of the machine 102, display an alert, notification, etc. on the user interface 124 of the communication device 120, among other things).

Thus, the systems and methods described herein utilize sensor(s) 130 on a machine 102 (e.g., such as sensor(s) 130 located on the front end, sides, and/or back end of the machine 102) to track an environment around (e.g., in front of and behind) the machine 102 to generate profiles. The front profile is used to determine an expected volume of material removed. The back profile (e.g., actual cut profile) of the machine 102 is used to determine an actual volume of material removed by the machine 102. The actual cut profile can also include actual cut depth(s) associated with cut edge(s) of the machine 102. The actual cut depth(s) can be used to provide real-time controls to a controller 110 of the machine 102.

Figure 2:
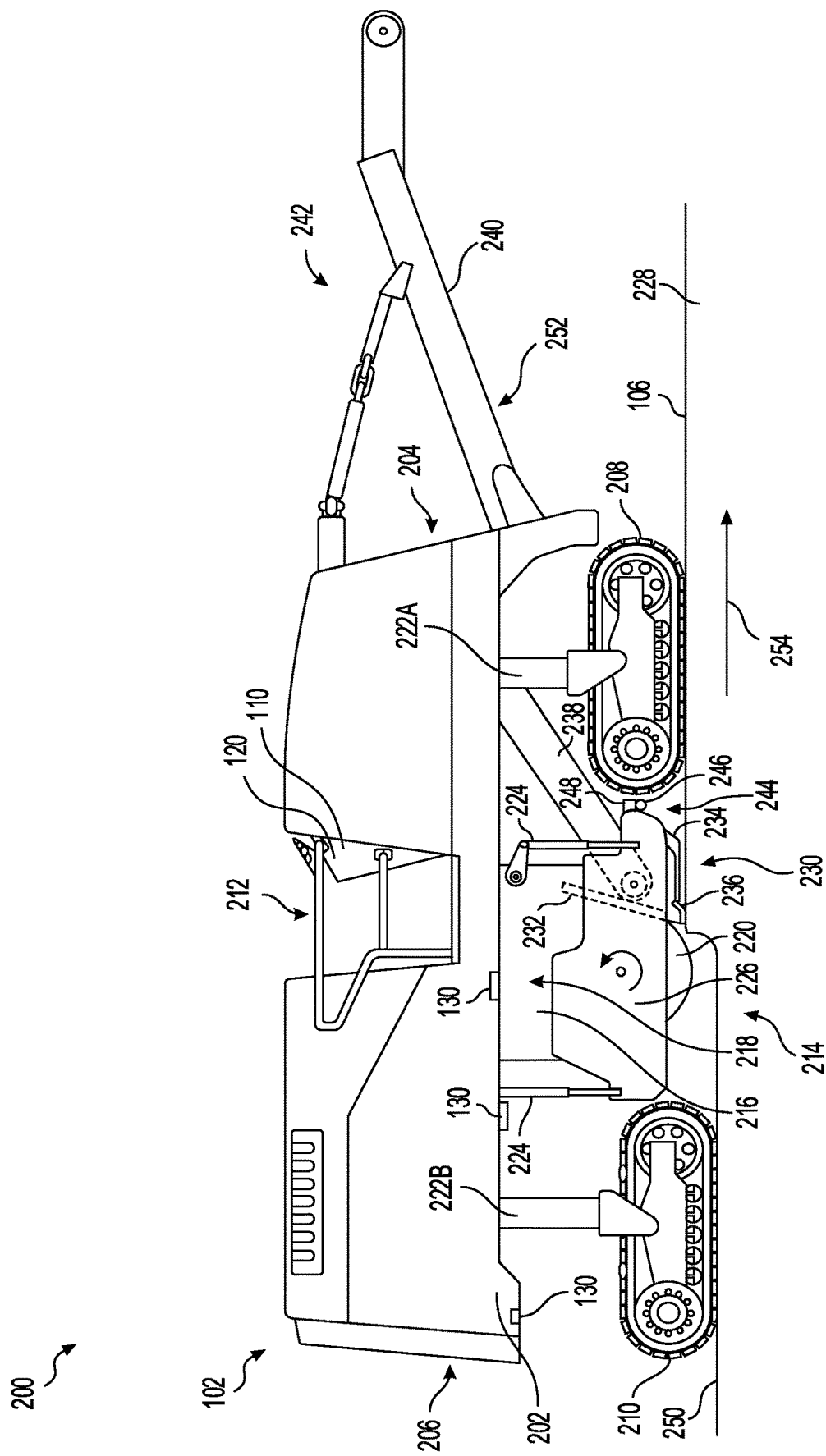
FIG. 2 a side view of a machine having a cutting system, an anti-slabbing system, a conveyor system, and a partial-cut-width sensor system.

FIG. 2 illustrates an example side view of the machine 102 discussed above with respect to FIG. 1. As will be explained in greater detail below, and as shown in FIG. 2, the example machine 102 includes a cutting system 214, an anti-slabbing system 230, a partial-cut-width sensor system 244, and/or a conveyor system 252. In the illustrated example, the machine 102 comprises a cold planer 102.

As illustrated, the machine 102 comprises a frame 202. The frame 202 comprises a front frame end 204 and a back frame end 206. The machine 102 further comprises front propulsion elements 208 and back propulsion elements 210, which are coupled to the frame 202 proximate to the front frame end 204 and the back frame end 206, respectively. The front propulsion elements 208 and back propulsion elements 210 comprise two parallel ground engaging tracks, although the present disclosure is not thereby limited. In some examples, the machine 102 is configured to drive over material 228, such that front propulsion elements 208 roll on an uncut work surface 106. The machine 102 is also configured to remove material 228 from the work surface 106 (e.g., such as a road way and leave a cut surface 250 (e.g., a surface from which paving material has been completely removed or a surface of paving material from which an upper-most layer of paving material has been removed) behind. In some examples, the back propulsion elements 210 roll on the cut surface 250 and the cutting system 214 produces an edge of the material 228 between the work surface 106 and the cut surface 250.

As illustrated, the machine 102 further comprises an operator control station 212. The operator control station 212 is coupled to the frame 202 and comprises a controller 110 configured to perform control and monitoring functions of the machine 102 and a computing device 120, as described above. The machine 102 includes a cutting system 214, which is coupled to the frame 202. The cutting system 214 comprises a housing 216 that defines a cutting chamber 218 for rotatable cutting drum 220 that is carried by the frame 202 of the machine 102.

The machine 102 further comprises elevation control legs, or support posts, 222A and 222B configured to raise and lower the housing 216 relative to the work surface 106 and/or the frame 202, including the cutting chamber 218 with the cutting drum 220, typically in conjunction with adjustments to a cutting depth of the cutting system 214. In some examples, the machine 102 includes side plate cylinders 224, which are configured to adjust the height of one or more side plate(s) 226. The cutting system 214 further includes a cutting tool, such as rotatable cutting drum 220 that rotates in a direction counter to a forward travel direction of machine 102. Rotatable cutting drum 220 is fixed within housing 216 and configured to cut material 228 of the work surface 106 underlying the machine 102.

As illustrated, the machine 102 comprises an anti-slabbing system 230. The anti-slabbing system 230 is coupled to the housing 216 of the cutting chamber 218 and includes an upwardly oriented base plate 232 relative to the work surface 106, extending across a front side of the cutting chamber 218. The anti-slabbing system 230 further comprises a plow 234 for pushing loose objects lying upon material 228, and a plurality of skids 236. Sides of the cutting chamber 218 that are adjacent to the cutting tool 220 of the cutting system 214 are enclosed by the side plates 226. The machine 102 further comprises a primary conveyor 238, which is coupled to and supported by the base plate 232. The primary conveyor 238 feeds material 228 cut via the cutting drum 220 to a secondary conveyor 240 projecting forward of the front frame end 204. The secondary conveyor 240 is coupled to a positioning mechanism 242, which enables left, right, and up and down position control of the secondary conveyor 240. In some examples, the secondary conveyor 240 is configured to deposit the material 228 into a receptacle, such as a box of a hauling machine (e.g., second machine 104).

The machine 102 is configured to travel in a forward direction 254 to remove material 228. The anti-slabbing system 230 travels over the top of material 228 to prevent or inhibit the material 228 from becoming prematurely dislodged during operations for removal of the material 228. A rotatable cutting drum 220 follows behind the anti-slabbing system 230 to engage the material 228. The rotatable cutting drum 220 is configured to rotate in a counter-clockwise direction (from the perspective of FIG. 2), such that the material 228 is uplifted and broken up into small pieces by cutting teeth of the rotatable cutting drum 220. The anti-slabbing system 230 is configured to contain pieces of material 228 within a cutting chamber 218. The removed pieces of the material 228 are pushed up primary conveyor 238 of the conveyor system 252 and carried in a forward direction 254, such as by an endless belt, to a secondary conveyor 240 of the conveyor system 252. The secondary conveyor 240 is cantilevered forward of the front frame end 204 to be positioned over a collection vessel, such as the box of a second machine 104 (e.g., a hauling machine).

As illustrated, the machine 102 comprises a partial-cut-width sensor system 244 for determining a width at which the cutting system 214 is cutting the material 228. The partial-cut-width sensor system 244 comprises a mounting bar 248 and a sensor array 246. In some examples, the mounting bar 248 is mounted within the machine 102 in front of the cutting system 214 and positions the sensor array 246 across material 228. In an example, mounting bar 248 is directly connected to the frame 202. In some examples, the mounting bar 248 is indirectly connected to the frame 202, such as by attachment to an upper portion of the anti-slabbing system 230 or a lower portion of the anti-slabbing system 230. In some examples, the partial-cut-width sensor system 244 comprises a plurality of sensors 130 located at intervals across the width of the cutting drum 220. In some examples, the sensors 130 comprise discrete distance sensors. However, other types of partial-cut-width sensor systems can be used.

As illustrated, the machine 102 comprises sensor(s) 130 disposed at various additional locations (e.g., side(s) and/or back end) on the machine 102. For instance, sensor(s) 130 are configured to capture sensor data in an environment surrounding the machine 102 and include lidar sensors, radar sensors, cameras (e.g., RGB, IR, intensity, depth, time of flight, etc.), cut-depth sensors, audio sensors, ultrasonic transducers, sonar sensors, location sensors (e.g., GPS, compass, etc.), inertial sensors (e.g., inertial measurement units, accelerometers, magnetometers, gyroscopes, etc.), environment sensors (e.g., temperature sensors, humidity sensors, light sensors, pressure sensors, etc.), laser scanners, LED scanners, 3-D scanners, 2-D scanners, and the like. In some examples, the sensor(s) 130 are mounted to the frame 202 of the machine 102. In some examples, the sensor(s) are fixed to the frame 202 of the machine. For instance, in some examples, one or more of the sensor(s) 130 are mounted at a fixed position on the frame 202 of the machine 102, such that a field of view of the one or more sensor(s) 130 remains fixed relative to the frame 202 of the machine 102. In some examples, one or more of the sensor(s) 130 are mounted to the frame 202 of the machine 102 based on the horizon. For instance, in some examples, the machine 102 operates on a work surface 106 that is angled (e.g., inclined or declined). In this example, the one or more of the sensors 130 can be mounted to the frame of the machine using a dynamic mount (e.g., a gimbal mount, or any other similar mount), such that the one or more sensor(s) 130 present a fixed field of view relative to the horizon and/or an axis that is not governed by the angle of the machine 102. In some examples, the sensor(s) 130 may be disposed at any location on the machine 102. For instance, one or more sensor(s) 130 may be disposed at one or more location(s) and/or portion(s) of any component(s) of one or more of the cutting system 214, the anti-slabbing system 230, the partial-cut-width sensor system 244, and/or the conveyor system 252 described herein.

In some examples, the data from the sensor(s) 130 is used to evaluate the operation and performance of the machine 102. For instance, roadways are typically multiple times wider than the width of a machine 102. As such, multiple passes of the machine 102 are used to remove the complete width of the material 228. However, not all passes of machine 102, particularly the last pass, extend across a width of material 228 that takes up the full width of cutting system 214 (e.g., the width of cutting drum 220). If the partial-cut-width is not taken into account, material removal volume calculations can become skewed, particularly when long stretches of roadway material is being removed.

Accordingly, the processor(s) 132 and/or controller(s) 110, 116 can be used to evaluate productivity measurements of machine 102 in real-time during an operation and/or at the end of an operation (e.g., cut path, removal of material 228, etc.). For instance, the machine 102 is configured to remove material 228 at a certain depth (e.g., the difference in height between work surface 106 and cut surface 250). As such, the sensor(s) 130 can collect raw sensor data (e.g., associated with cut depth of the cutting system 214), which can be sent to a computing device 122. The processor(s) 132 of the computing device 122 process the raw sensor data (e.g., via image processing and/or machine-trained mechanism(s)) and generates one or more profiles (e.g., cut profiles) indicative of the amount, location, physical dimensions, and/or other characteristics of the material 228 removed by the machine 102. Based on the one or more profiles, the processor(s) 132 of the computing device 122 can determine, in near real-time, the actual cut depth (e.g., distinguishes between cut and uncut surface). In some examples, the raw sensor data may comprise a speed of the machine, a distance traveled by the machine, along with other data. Processor(s) (e.g., processor(s) 132 of the computing device 122 and/or processor(s) 132 of the remote system 114) and/or a controller (e.g., controller 110 and/or system controller 116) determine based at least in part on the raw sensor data and a width of the cutting system 214, a volume (e.g., expected volume and/or actual volume) of material 228 removed by the machine 102 for a given period of time. As described below, the partial-cut-width sensor system 244, and others described herein, are configured to sense how much of the width of the cutting drum 220 the cutting system 214 is actually cutting material 228, thereby providing a more accurate determination of volume removed.

Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in memory associated with the computing device 122 and/or the remote system 114 for use during operation of the machine 102.

In some examples, data collected by partial-cut-width systems described herein, as well as other information collected by machine 102, is sent off-board of machine 102 for processing and evaluating at locations outside of machine 102 (e.g., such as computing device 122 and/or remote system 114), thereby saving machine 102 from having to include expensive data processing hardware and software having to be frequently updated and/or reduces the risk of damage due to the harsh environments in which the machine 102 is used. While processing of sensor data and determination of volume(s), generation of profile(s) is described herein as occurring off-board of the machine 102 (e.g., at the computing device 122, the processing, determination(s), generation(s), etc. described herein may be performed by one or more controller(s) 110 on-board the machine 102 and/or system controller(s) 116 of a remote system 114).

Figure 3:
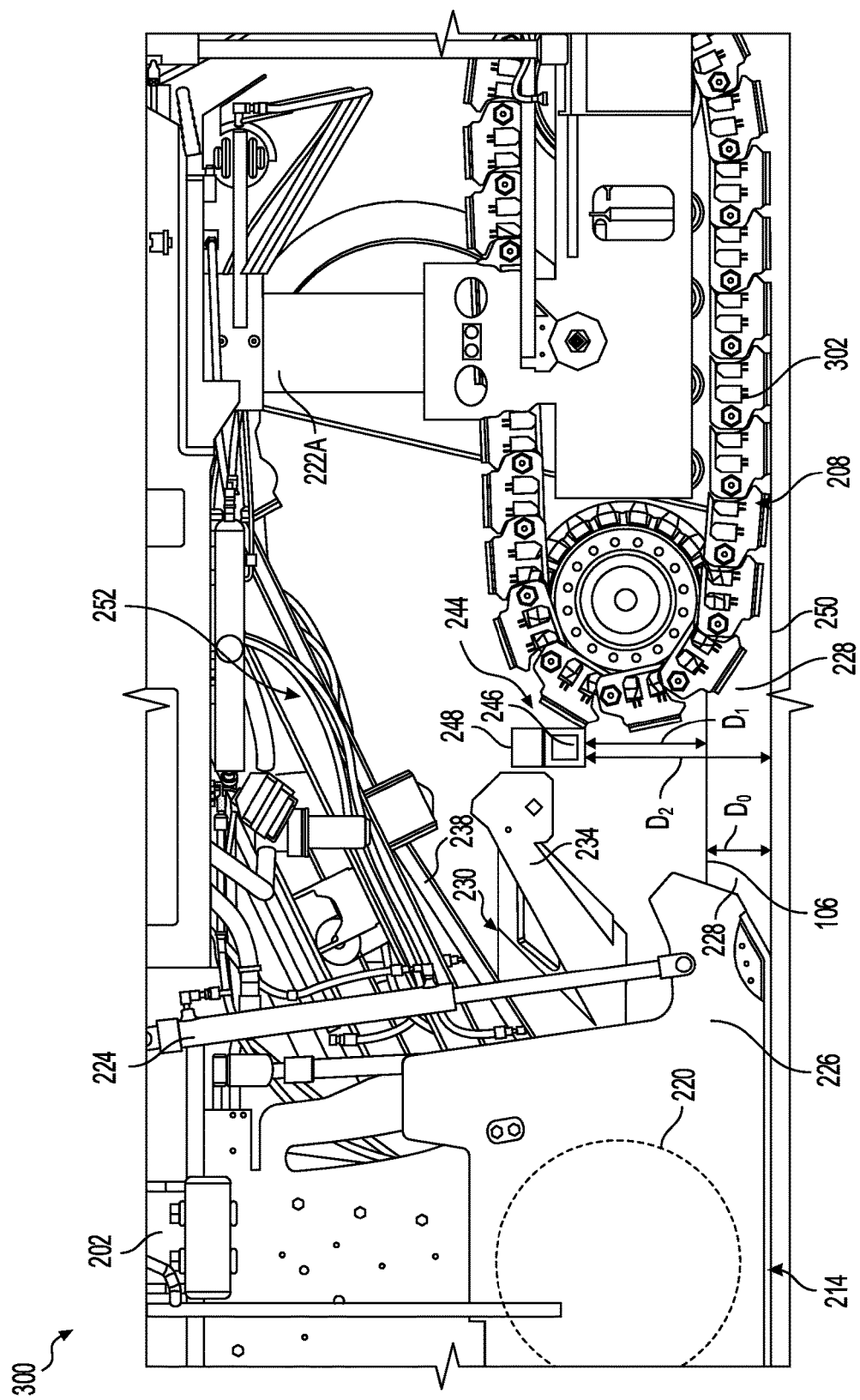
FIG. 3 is another illustration of the cutting system, anti-slabbing system, conveyor system, and partial-cut-width sensor system of FIG. 2.

FIG. 3 is another illustration of the cutting system, anti-slabbing system, conveyor system, and partial-cut-width sensor system of FIG. 2. As illustrated in FIG. 3, the example machine 102 includes the cutting system 214, anti-slabbing system 230, partial-cut-width sensor system 244, and conveyor system 252, of FIG. 2 described above.

As illustrated in greater detail and described above, the cutting system 214 comprises a rotatable cutting drum 220 positioned behind side plate 226. Side plate 226 is attached to housing 216 (not shown) defining the cutting chamber 218 (not shown). As described above, the anti-slabbing system 230 is coupled to housing 216 (not shown) defining the cutting chamber 218 (not shown) in front of the cutting drum 220. As illustrated, the anti-slabbing system 230 comprises plow 234, to which are mounted skids 236 (not shown) and base plate 232 (not shown). As described above, primary conveyor 238 (not shown) is coupled to the anti-slabbing system 230 and extends from a first end proximate to the anti-slabbing system 230 to a second end forward of anti-slabbing system 230 within the machine 102.

As illustrated, front propulsion element 208, comprises an endless track 302. The front propulsion element 208 is coupled to frame 202 by elevation control leg 222A. As described above, elevation control leg 222A is operated by controller 110 of the machine 102. For instance, when the controller 110 of the machine 102 receives instructions related to elevation control leg 222A. In some examples, the controller 110 executes the instructions and causes the elevation control leg 222A to change the position of the frame 202 relative to material 228 to, for example, assist in changing the cutting depth of cutting system 214. Although illustrated in an elevated position above material 228, the anti-slabbing system 230 can be lowered to rest on top of material 228 at work surface 106.

In some examples, the cutting system 214 is lowered such that side plate 226 rests on the cut surface 250 adjacent to the material 228. As the front propulsion element 208 (and back propulsion element 210 (not shown)) moves the machine 102 along material 228, the cutting drum 220 engages an edge of the material 228. In some examples, such as during a full width pass, material 228 extends all the way across the cutting drum 220 between side plates 226. In other examples, and as illustrated in FIG. 3, during a partial width pass, material 228 extends across a portion of the cutting drum 220 between side plates 226. In this example, the computing device 122 determines an expected volume of material 228 removed based on data comprising (i) a depth measurement for depth do (equal to the difference in distances $d_1$ (e.g., difference in elevation and/or depth between sensor array 246 and work surface 106) and $d_2$ (e.g., difference in elevation and/or depth between sensor array 246 and cut surface 250 that is adjacent to the machine 102) for work surface 106 and cut surface 250), (ii) a width of the cutting drum 220, (iii) a travel distance measurement of machine 102. In some examples, the depth measurement do is determined using a data from a cut depth sensor 130. In some examples, the machine 102 is operating such that the material 228 is cut across, in a Z-direction with respect to an axis shown in the perspective views of FIGS. 4-6 below, a partial width of the cutting drum 222. In this example, the sensor array 246 includes a plurality of sensors 130 spaced across the width of machine 102 to determine the proportion of the width of cutting drum 220 that is removing material 228. The determined partial cut width is used in conjunction with the data (e.g., sensor data, operational data, etc.) described above to determine the expected volume of material 228 removed by the machine 102.

Figure 4:
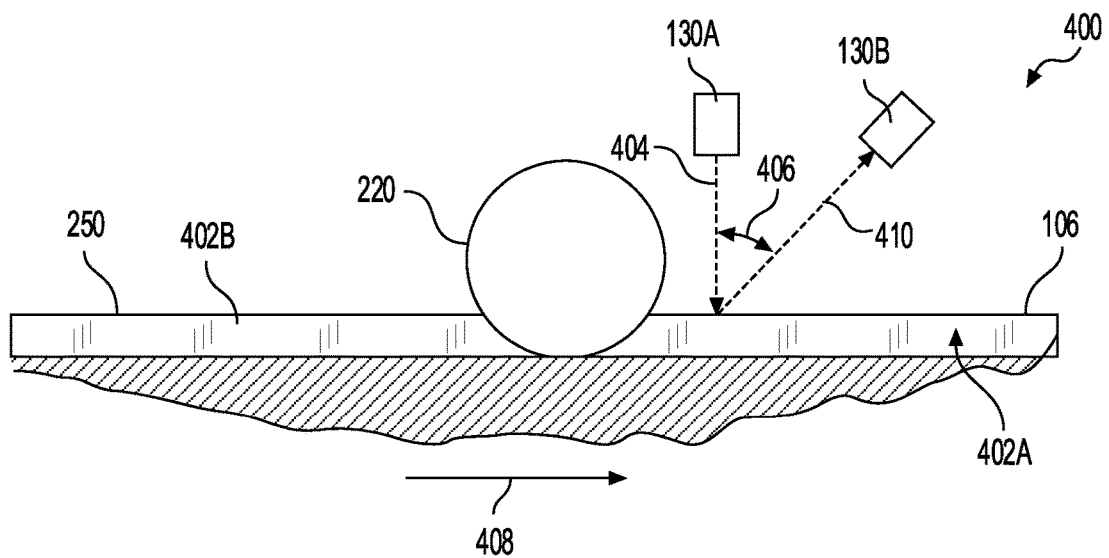
FIG. 4 is a schematic view of an example laser profile scanner system configured to perform triangulation-type measurements of partial-cut widths.
Figure 5:
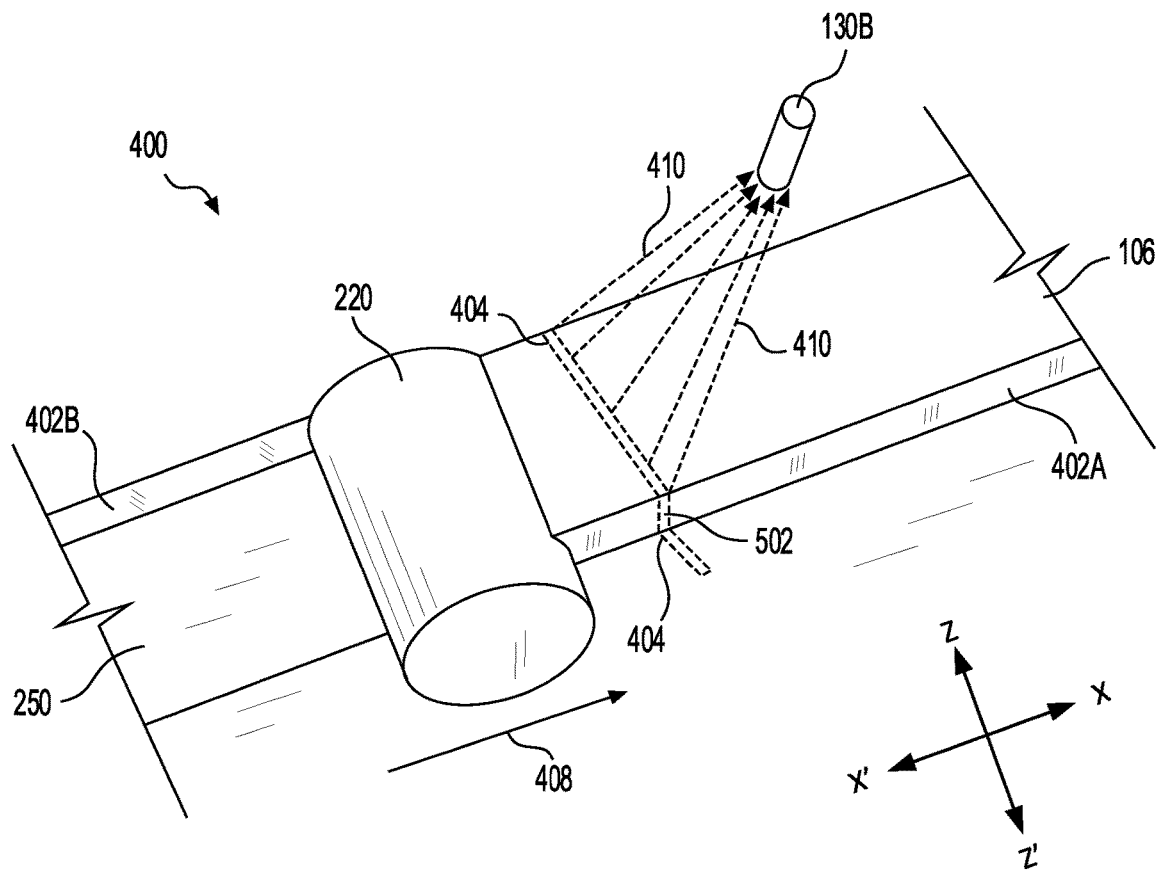
FIG. 5 is a perspective view of the laser profile scanner system of FIG. 4 showing a scanned edge of a partial-cut width strip of material in front of a machine.
Figure 6:
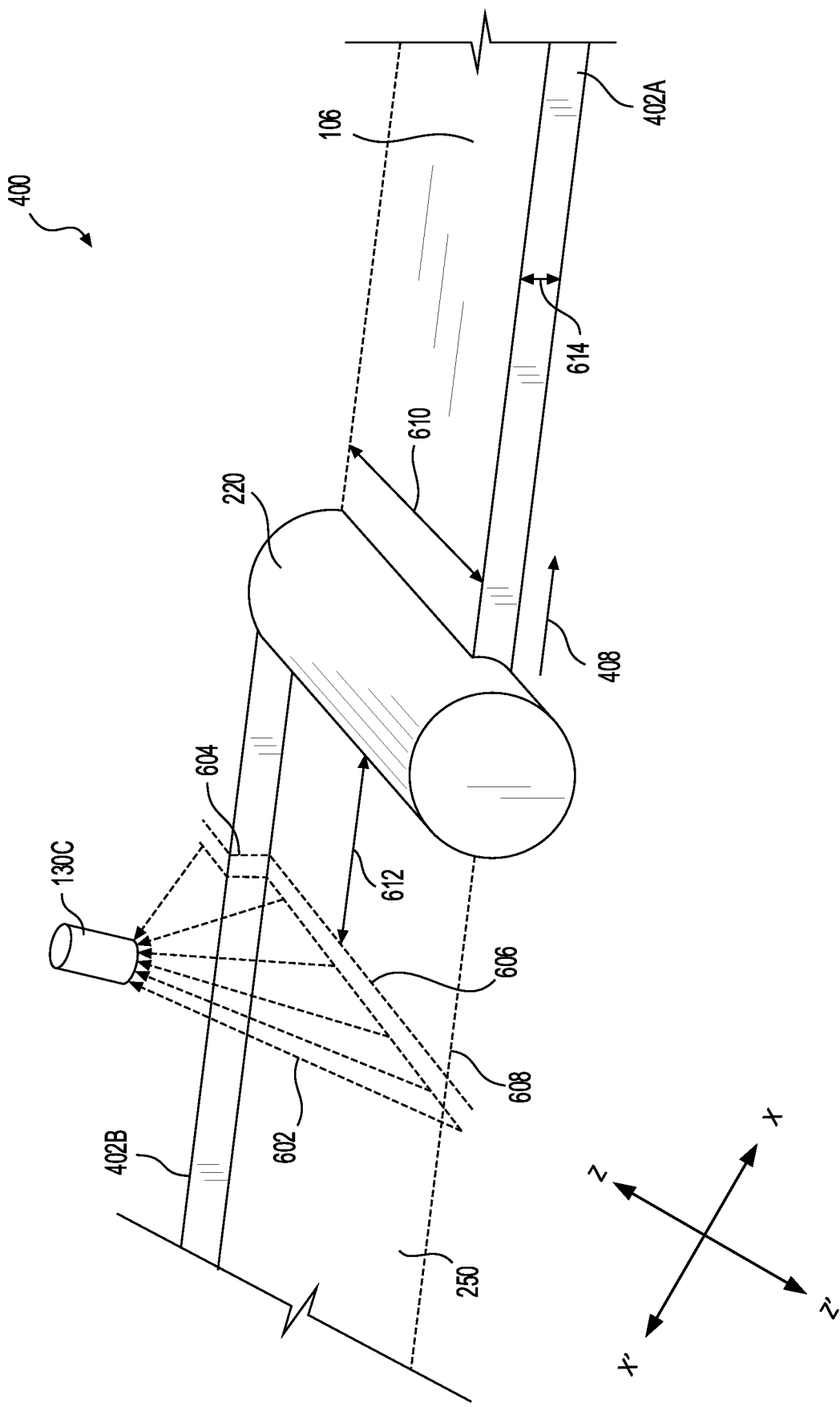
FIG. 6 is another perspective view of the laser profile scanner system of FIGS. 4 and 5, showing a scanned edge of a partial-cut width strip of material behind a machine.

FIGS. 4-6 illustrate schematic and perspective view(s) of a laser profile scanner system 400 of a machine 102. While the laser profile scanner system 400 is described as measuring distance to objects using triangulation methods, other methods (e.g., measuring distances using time of flight of reflected signals) may be used.

FIG. 4 illustrates a schematic side view 400 for a laser profile scanner system 400 of a machine 102. The laser profile scanning system 400 comprises a first sensor 130A and a second sensor 130B (collectively referred to as sensor(s) 130). Sensor(s) 130 are configured to view work surface 106 (e.g., ground in front of drum 220). As illustrated, work surface 106 includes a first edge 402A and a second edge 402B. The first edge 402A comprises a previously cut edge by the machine 102. The second edge 402B comprises an edge currently being cut by the drum 220 (e.g., cutting drum 220) of the machine 102. In some examples, the first sensor 130A and the second sensor 130B are included as part of sensor array 246 described above. In some examples, the exact positions of the first sensor 130A (e.g., the source), and the second sensor 130B (e.g., the receiver) relative to the frame 202 of the machine 102, as well as the angle 406 (e.g., an angular orientation of the first sensor 130A and the second sensor 130B relative to the frame 202) between the first sensor 130A and the second sensor 130B are known to a computing device 122 and/or remote system 114. For instance, memory of the computing device 122 and/or remote system 114 can store the exact positions of the first sensor 130A and the second sensor 130B, and the angle 406.

In some examples, the first sensor 130A and second sensor 130B comprise laser profile scanning devices suitable for determining a profile of a surface (e.g., work surface 106) in front of the drum 220. In some examples, a triangulation method is used to measure distances to objects. For instance, in some examples, the first sensor 130A comprises a laser source and the second sensor 130B comprises a receiver. In some examples, the machine 102 is moving (e.g., advancing) along work surface 106 in a direction 408. The first sensor 130A (e.g., the source) projects a laser beam 404 downward onto the work surface 106 directly in front of the advancing cutting drum 220. As illustrated, the second sensor 130B (e.g., the receiver) receives reflected light 410 from the first sensor 130A.

As illustrated in FIG. 5, the laser profile scanning system 400 includes a displacement or step 502 (e.g., difference in elevation between work surface 106 and cut surface 250) that is detected by processor(s) 132 in laser beam 404. As described above, the exact positions of the first sensor 130A (e.g., the source), and the second sensor 130B (e.g., the receiver) relative to the frame 202 of the machine 102, as well as the angle 406 (e.g., an angular orientation of the first sensor 130A and the second sensor 130B relative to the frame 202) between the first sensor 130A and the second sensor 130B are known to a computing device 122 and/or remote system 114. For instance, memory of the computing device 122 and/or remote system 114 can store the exact positions of the first sensor 130A and the second sensor 130B, and the angle 406. Accordingly, the processors 132 of the computing device 122 and/or processors 132 of the remote system 114 can access the known positions from memory of the respective devices and use the known positions of the sensors 130 and the angle 406 between the sensors 130 to determine the position of the step 502 representing the location of the first edge 402A (e.g., relative to second edge 402B (e.g., edge currently being cut)), using triangulation.

In some examples, the first sensor 130A (e.g., the source sensor), and the second sensor 130B (e.g., the receiver), can, alone or with the assistance of controller 110 or off-board computing device 122, measure the distance between the machine 102 and one or more of the work surface 106 and/or the cut surface 250. For instance, the signals can be transformed into a Cartesian coordinate system projected onto work surface 106. As illustrated, FIG. 5 includes a displacement and/or step 502 (e.g., corresponding to a depth (e.g., difference in height) between work surface 106 and cut surface 250). In some examples, the step 502 is detected (e.g., by the first sensor 130A and/or second sensor 130B alone, or with the assistance of controller 110 or the off-board computing device 122), using mathematical gradient methods. In some examples, the position of previously cut edge 402A relative to the side of cutting drum 220 that is proximate to the second edge 402B is determined using the step 502. In some examples, the position of the previously cut edge 402A relative to the side of cutting drum 220 that is proximate to edge 402B is used to determine a percentage of the width of drum 220 that is actually cutting work surface 106.

FIG. 6 illustrates another perspective view of the laser profile scanning system 400 of FIGS. 4 and 5, as used to perform the triangulation process described above. As illustrated, FIG. 6 shows a scanned edge of a partial-cut width of material behind a machine 102. As illustrated, the laser profile scanning system 400 comprises a third sensor 130D and a fourth sensor 130D (not shown) (collectively referred to as sensor(s) 130). Sensor(s) 130 are configured to view cut surface 250 (e.g., ground behind the cutting drum 220). As illustrated, cut surface 250 includes an indication 608 of a first edge 402A and a second edge 402B. The indication 608 of the first edge 402A comprises the previously cut edge by the machine 102. The second edge 210B comprises an edge currently being cut by the cutting drum 220 of the machine 102.

In some examples, the third sensor 130C and the fourth sensor 130D (not shown) are one or more types of sensor(s) 130, described above. In some examples, the exact positions of the third sensor 130C and the fourth sensor 130D relative to the frame 202 of the machine 102 are known and stored in memory of a computing device 122 and/or remote system 114. For instance, as described above, sensor(s) 130C and 130D can be mounted to the frame 202 of the machine 102. For instance, in some examples, the sensor(s) 130C, 130D are mounted at a fixed position on the frame 202 of the machine 102, such that a field of view of the one or more sensor(s) 130C, 130D remains fixed relative to the frame 202 of the machine 102. In some examples, one or more of the sensor(s) 130C, 130D are mounted to the frame 202 of the machine 102 based on the horizon. For instance, in some examples, the machine 102 operates on a work surface 106 that is angled (e.g., inclined or declined). In this example, one or more of the sensors 130C, 130D are mounted to the frame 202 of the machine 102 using a dynamic mount (e.g., a gimbal mount, or any other similar mount), such that the one or more of sensor(s) 130C, 130D present a fixed field of view relative to the horizon and/or an axis that is not governed by the angle (e.g., the incline or decline) of the machine 102.

In some examples, the exact positions of the third sensor 130C (e.g., the receiver), and the fourth sensor 130D (e.g., the source) relative to the frame 202 of the machine 102, as well as the angle (not shown) (e.g., an angular orientation of the third sensor 130C and the fourth sensor 130D relative to the frame 202) between the third sensor 130C and the fourth sensor 130D are known to a computing device 122 and/or remote system 114. For instance, memory of the computing device 122 and/or remote system 114 can store the exact positions of the third sensor 130C and the fourth sensor 130D, and the angle. In some examples, a distance 612 between a position of the third sensor 130C and/or fourth sensor 130D (relative to the frame 202 of the machine 102 and/or the cut surface 250) and the cutting drum 220 (relative to the frame 202 of the machine 102 and/or the cut surface 250) is known and stored in memory.

In some examples, the third sensor 130C and fourth sensor 130D (not shown) comprise laser profile scanning devices suitable for determining a profile of a surface (e.g., cut surface 250) behind the cutting drum 220. In some examples, a triangulation method is used to measure distances to objects. For instance, in some examples, the third sensor 130C comprises a receiver and the fourth sensor 130D (not shown) comprises a laser source. In some examples, the machine 102 is moving (e.g., advancing) along work surface 106 in a direction 408. The third sensor 130C (e.g., the receiver) receives reflected light 602 from a laser beam 606 that is projected by the fourth sensor 130D downward onto the cut surface 250 behind the advancing cutting drum 220.

As described above, the exact positions of the third sensor 130C (e.g., the receiver), and the fourth sensor 130D (e.g., the source sensor (not shown)) relative to the frame 202 of the machine 102, and an angle (not shown) between sensors 130C and 130D are known to a computing device 122 and stored in memory. For instance, memory of the computing device 122 and/or memory of the remote system 114 can store the exact positions of the third sensor 130C and the fourth sensor 130D, and the angle. Accordingly, processor(s) 132 of a computing device 122 and/or remote system 114 can access the known positions from memory of the respective devices and use the known positions of the sensors 130C and 130D (not shown) and the angle between the sensors 130 to determine the position of the step 604, using triangulation. In some examples, the step 604 comprises an actual cut depth associated with the second edge 402B.

In some examples, the third sensor 130C (e.g., the receiver sensor), and the fourth sensor 130D (e.g., the source sensor), can, alone or with the assistance of controller 110 of the machine 102 or processor(s) 132 of an off-board computing device 122 and/or remote system 114, measure the distance between the machine 102 and one or more of the work surface 106 and/or the cut surface 250. For instance, the signals can be transformed into a Cartesian coordinate system projected onto work surface 106. As illustrated, a second displacement and/or step 604 is detected. In some examples, the second step 604 is detected (e.g., by the third sensor 130C and/or fourth sensor 130D alone, or with the assistance of controller 110 of the machine, or processor(s) 132 of the off-board computing device 122 and/or the remote system 114), using mathematical gradient methods.

In some examples, the computing device 122 further stores one or more of the distance 612 between the third sensor 130C and the cutting drum 220, a determined cut width 610 (e.g., partial cut width and/or full cut width of the cutting drum 220) in front of the cutting drum 220, and/or a first cut depth 614 associated with the first edge 402A. In some examples, the first cut depth 614 comprises an actual cut depth associated with the first edge 402A. Accordingly, the processor(s) 132 of the computing device 122 and/or remote system 114 generate one or more profiles (e.g., cut profiles) for the machine 102, based at least in part on the sensor data received from sensor(s) 130 on the machine 102.

Accordingly, the systems and methods described herein for utilize sensor(s) 130 on a machine 102 to track an environment around (e.g., in front of and behind) the machine 102 to generate actual cut profiles and determine actual cut volume. Such systems and methods are used to more accurately determine costs at the worksite 108, as well assist with real-time control of cutting drum 220 height during operation of the machine 102.

FIG. 7 is a flow chart depicting an example method 700 associated with the system 100 shown in FIG. 1. The process is illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. Although any of the processes or other features described with respect to the method 700 may be performed by processor(s) 132 of a computing device 122, for ease of description, the example method 700 will be described below as being performed by the processor(s) 132 and/or system controller 116 of the remote system 114 (e.g., back end server) unless otherwise noted.

As shown in FIG. 7, at 702, one or more processor(s) 132 receive first information captured by first sensor(s) 130 carried by a machine 102 disposed at worksite 108. In some examples, the processor(s) 132 are associated with computing device 122. In some examples, the processor(s) 132 are associated with the remote system 114 (e.g., such as back-end servers). The processor(s) 132 receive the first information from a controller 110 of the machine 102 via a network 112. In some examples, the first information comprises one or more of raw sensor data (e.g., unprocessed sensor data), image data (processed and/or unprocessed), and/or sensor data (e.g., processed sensor data) associated with the first sensor(s) 130, a distance traveled by the machine 102, a time (e.g., duration) the machine 102 has been operating, width of a distance between the sensor(s) and a cutting tool of the machine 102, speed of the machine 102, a width of the cutting tool of the machine 102, images associated with the sensors, a partial cut width associated with the cutting tool of the machine 102, and/or any other data detected by the sensor(s).

In some examples, the first sensor(s) 130 are disposed at a first location on the machine 102. For instance, where the machine 102 comprises a cold planer 102, the processor(s) 132 receive the first information from the first sensor(s) 130 included as part of the sensor array 246 described above. In this example, the first information comprises raw sensor data and/or sensor data associated with sensor(s) 130 positioned in front of a cutting drum 220 of the machine 102.

At 704, the processor(s) 132 generate, based at least partly on the first information, a first profile of a work surface in front of the machine 102. In some examples, the processor(s) 132 process the raw sensor data to generate the sensor data (e.g., processed sensor data) and generate the first profile using the sensor data. In some examples, the first profile comprises a location associated with a front end of the machine 102. For instance, where the first sensor(s) 130 are positioned in front of a cutting drum, the first profile comprises an area in front of the cutting drum 220, across at least the width of the machine 102, and/or extending in front of the machine 102. In some examples, the first profile includes a substantially vertical cut edge defining a cut depth, and a substantially horizontal cut width, the substantially vertical cut edge and the substantially horizontal cut width being formed on the work surface 106 by the cutting tool (e.g., cutting drum 220) of the machine 102

At 706, the processor(s) 132 determine, based at least partly on the first profile, an estimated volume of material removed by the machine 102 from the worksite 108. As described above, the processor(s) 132 determine the expected volume of material removed from the worksite 108 by the machine 102 using data comprising (i) a depth measurement for depth do (equal to the difference in distances $d_1$ and $d_2$ for work surface 106 and cut surface 250), (ii) a width of the cutting drum 220 (e.g., full width and/or partial cut width), (iii) a travel distance measurement of machine 102. In some examples, the depth measurement do is determined using a data from a cut depth sensor, such as a sensor 130 on sensor array 246 described above.

At 708, the processor(s) 132 receive second information captured by one or more second sensor(s) carried by the machine 102. The processor(s) 132 receive the second information from the controller 110 of the machine 102. In some examples, the processor(s) 132 receive the second information via the network 112. In some examples, the second information comprises one or more of raw sensor data (e.g., unprocessed sensor data) and/or sensor data (e.g., processed sensor data) associated with the second sensor(s), a distance traveled by the machine 102, a time (e.g., duration) the machine 102 has been operating, width of a distance between the sensor(s) and a cutting tool of the machine 102, speed of the machine 102, a width of the cutting tool of the machine 102, images associated with the second sensor(s), laser scans, a partial cut width associated with the cutting tool of the machine 102, and/or any other data detected by the second sensor(s). In some examples, the second sensor(s) comprise one or more of sensor(s) 130 described above.

In some examples, the second sensor(s) are disposed at a second location on the machine 102. In some examples, the second location is different from the first location. For instance, where the machine 102 comprises a cold planer 102, the first sensor(s) 130 are included as part of the sensor array 246 described above and the second sensor(s) comprise sensor(s) 130 described above. As described above, sensor(s) 130 are located in one or more position(s) behind the cutting drum of the machine 102 and may be mounted to the machine 102 in various ways. In this example, the second information comprises raw sensor data, image data, and/or sensor data associated with sensor(s) 130 positioned behind the cutting drum 220 of the machine 102.

At 710, the processor(s) 132 generate, based at least partly on the second information, a second profile of a cut surface behind a cutting tool of the machine. In some examples, the processor(s) 132 process raw sensor data included in the second information to generate the sensor data (e.g., processed sensor data) and generate the second profile using the sensor data. In some examples, the second profile comprises a location associated with a back end of the machine 102. In some examples, the second profile includes a substantially vertical cut edge defining a cut depth, and a substantially horizontal cut width, the substantially vertical cut edge and the substantially horizontal cut width being formed on the work surface 106 by the cutting tool (e.g., cutting drum 220) of the machine 102. In some examples, the cutting tool comprises cutting drum 220 of the machine 102 and the second profile comprises an area behind the cutting drum 220. In some examples, the second profile includes an area across at least the width of the machine 102, and/or extending behind the machine 102.

At 712, the processor(s) 132 determine, based at least partly on the second profile, an actual cut depth associated with a cut edge of the machine. In some examples, the processor(s) 132 determine a second actual cut depth associated with a second cut edge of the machine. In some examples, the actual cut depth associated with the cut edge of the machine 102 comprises a depth 614 of the first edge 402A described above. In some examples, the second actual cut depth comprises a second depth 604 of the second edge 402B described above.

At 714, the processor(s) 132 determine a difference between one or more of an expected cut depth associated with the first cut edge and the actual cut depth. In some examples, the processor(s) additionally, or alternatively determine a difference between a second expected cut depth associated with the second cut edge and the second actual cut depth. In some examples, one or more of the difference(s) are determined based on comparing the actual cut depth to an expected cut depth associated with the first cut edge of the machine and/or comparing the second actual cut depth to a second expected cut depth associated with the second cut edge of the machine. In some examples, the expected cut depth and/or the second expected cut depth can be stored in memory of the controller 110, computing device 122, and/or remote system 114. In some examples, the expected cut depth and/or the second expected cut depth is a value set by a person (e.g., an operator of the machine 102, a foreman, etc.) at the worksite 108, prior to operation of the machine 102. For instance, where the machine 102 comprises a cold planer, the expected cut depth associated with the first cut edge (e.g., 402A and/or right side of the cutting drum 220) and/or the second expected cut depth associated with the second cut edge (e.g., 402B and/or left side of the cutting drum 220) of the machine 102 of the machine 102 can be set to any depth (e.g., zero millimeters, 75 millimeters, etc.) and stored in the memory. In some examples, the expected cut depth and/or the second expected cut depth comprises a depth that the cutting drum 220 of the machine 102 is set at to cut the material 228 of the work surface 106. In some examples, such as where the machine 102 comprises a grading machine, the expected cut depth and/or the second expected cut depth are defined based on a grade and/or a slope (e.g., an angle) of the machine. For instance, where a work surface is angled, the right side of the cutting drum may be lower than the center of the machine 102 compared to the left side of the cutting drum 220. In this example, the right side of the cutting drum is set, such that an expected cut depth (e.g., such as 70 millimeters) and slope (e.g., such as 3%) are defined. In this example, the left side of the cutting drum 220 is set to have a second expected cut depth (e.g., such as 75 millimeters). In some examples, the left-hand side of the cutting drum 220 also defines a slope.

At 716, the processor(s) 132 determine if a difference between the actual cut depth and the expected cut depth (and/or a difference between the second actual cut depth and the second expected cut depth) is greater than a threshold difference. In some examples, the threshold difference comprises a predetermined difference (e.g., 5 millimeters, 10 millimeters, etc.) set by the operator of the machine 102 and/or other worksite personnel at the worksite 108. Although 716 is described with respect to comparing a difference between an actual cut depth and an expected cut depth to a threshold, it is understood that any metric can be used. In some examples, the metric comprises a difference between the actual volume removed and the expected volume removed.

Where the processor(s) 132 determine that a difference is greater than or equal to the threshold difference, the method proceeds to 718. At 718, the processor(s) 132 generate an instruction configured to cause the machine 102 to perform a desired operation. For instance, where the machine 102 comprises a cold planer, the processor(s) 132 determine a desired operation based on determining that the threshold difference is exceeded. In some examples, the desired operation comprises raising and/or lowering a cutting drum 220 of the machine 102. For instance, where the machine's 102 expected cut depth is 75 millimeters and the actual cut depth is 81 millimeters, the processor(s) 132 compare the different (e.g., 6 millimeters) to a threshold difference. In this example, the threshold difference is 5 millimeters, accordingly, the processor(s) 132 determine the machine 102 is cutting above the threshold and generates an instruction to cause the controller 110 of the machine 102 to adjust the expected cut depth associated with the first cut edge. For instance, the instruction can indicate to the controller 110 to raise and/or lower the side of the cutting drum 220 associated with the first cut edge to be within the threshold difference. In some examples, the desired operation is associated with any controllable component of the machine 102 operably connected to a controller 110. For instance, in some examples, the desired operation comprises an automated steering correction, automated acceleration of the machine 102, an automated deceleration of the machine 102, automated start of the machine 102, automated stop of the machine 102, among other things.

At 720, the processor(s) 132 send the instruction to a controller 110 of the machine 102. In some examples, the instruction is sent via the network 112. In some examples, the controller 110 of the machine 102 is configured to execute the instruction and, based on executing the instruction, cause the machine 102 to perform the desired operation. In some examples, the processor(s) 132 send the instruction to the controller 110 to cause the controller 110 to execute the desired operation in near real-time. The processor(s) 132 continue to monitor the first sensor(s) 130 and/or second sensor(s) 130 as the machine 102 continues along a worksite 108.

Accordingly, the systems and methods described herein for utilize sensor(s) 130 on a machine 102 to track an environment around (e.g., in front of and behind) the machine 102 to generate cut profiles. Such systems and methods are used to more effectively operate machine(s) at a worksite 108 and improve efficiency at the worksite 108. For instance, by providing real-time feedback in the form of instructions to control an operation of the machine 102, worksite safety and efficiency is improved.

Where the processor(s) 132 determine that the difference is less than the threshold difference, the method proceeds to 722. In some examples, the method proceeds to 722 following execution of 720. In some examples, the processor(s) 132 continue to monitor sensor(s) 130. While 722 is described as occurring where the determination for 716 is a "NO" and/or after 720, it is understood that 722 may be performed following 714 and/or simultaneously with at least 716.

At 722, the processor(s) 132 determine, based at least partly on the second profile, an actual volume of material 228 removed by the machine 102 from the worksite 108. As described above, the actual volume of material 228 removed by the machine 102 from the worksite 108 it determined based on the second profile. For instance, the second profile comprises data including (i) a depth measurement for depth do (equal to the difference in distances $d_1$ and $d_2$ for work surface 106 and cut surface 250), (ii) a width measurement of the cutting drum 220 (e.g., full width and/or partial cut width), (iii) a travel distance measurement of machine 102. In some examples, the depth measurement do is determined using a data from a cut depth sensor 130, as described above.

In some examples, the second profile indicates that the machine 102 is removing a higher amount of volume than expected, the machine 102 is removing less volume than expected, and/or whether portions of the cut surface 250 include causes for concern (e.g., piece(s) of cutting drum 220 are broken, middle of the cut surface 250 is broken and/or not removed, etc.). For instance, where the worksite 108 comprises a roadway, the roadway comprises layer(s) of asphalt that is laid on top of concrete using a binder. In some examples, the binder is worn, such that when the machine 102 cuts the asphalt, some of the concrete that has not been cut by the cutting drum 220 is also removed. Accordingly, the second profile can indicate that extra material 228 has been removed from the worksite 108, resulting in a higher volume of material 228 removed than expected. As the machine 102 continues to travel along a worksite 108, the actual volume of material 228 removed is updated. In some examples, the actual volume of material 228 removed is updated in real-time. In some examples, the actual volume of material removed is updated intermittently (e.g., in intervals of time, based on a distance traveled by the machine, etc.). Accordingly, by using sensor(s) 130 positioned at the back end of the machine 102 to scan and create a second profile (e.g., actual cut profile) for an area behind the cutting drum 220, the techniques described herein provide a more accurate determination of actual volume removed by the machine 102.

At 724, the processor(s) 132 generate one or more report(s). In some examples, the one or more report(s) are associated with billing information, machine trip information, coordination with other machine(s) at the worksite 108, among other things. In some examples, the processor(s) 132 cause at least one of the one or more report(s) to be displayed on a display of a computing device 122. In some examples, the computing device 122 is associated with a foreman at the worksite 108. For instance, trip information comprises a trip meter indicating how much the machine 102 has traveled. Based on the trip meter, the one or more report(s) can indicate how much weight of material 228 has been offloaded onto a second machine 104 (e.g., such as a hauling machine). In this example, a foreman at the worksite can utilize the one or more report(s) to prevent machine(s) from being sent out overloaded and/or underloaded, thereby reducing costs and improving efficiency of the machine(s). In some examples, the one or more reports are generated at the remote system 114. In some examples, the actual volume removed and/or the one or more reports are sent, via the network 112 to the remote system 114.

Accordingly, the systems and methods described herein for utilize sensor(s) 130 on a machine 102 to track an environment around (e.g., in front of and behind) the machine 102 to generate cut profiles.

INDUSTRIAL APPLICABILITY

The present disclosure describes systems and methods for enabling automatic control of cut depth of a machine via a machine-controlled feedback loop and providing a manager of a worksite with machine profile(s) and actual volume of material removed by a machine 102. Such systems and methods are used to more effectively operate machines, such as one or more of the machines 102, 104 described above, at a worksite. For example, such systems and methods enable a manager of the worksite to reduce personnel on the worksite, improve safety, and more effectively coordinate operations of other machines based on profile(s) and actual volume of material removed determinations by a machine 102.

As a result, use of the systems and methods of the present disclosure reduces the computational resources, control infrastructure, and cost required to perform various operations at the worksite 108, thereby improving the efficiency of the system 100. In particular, the systems described herein can be implemented without using worksite personnel and corresponding resources. As a result, use of personnel, equipment, and/or other components typically associated with paving systems can be avoided.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:
1. A method, comprising:
receiving, by a processor of a computing device and from a controller of a machine disposed at a worksite, via a network, first information captured by one or more first sensors carried by the machine;

generating, by the processor and based at least partly on the first information, a first profile of a work surface in front of the machine;

determining, by the processor and based at least partly on the first profile, an estimated volume of material removed from the worksite by the machine;

receiving, by the processor and from the controller of the machine, via the network, second information captured by one or more second sensors carried by the machine;

generating, by the processor and based at least partly on the second information, a second profile of a cut surface behind a cutting tool of the machine;

determining, by the processor and based at least partly on the second profile, a first actual cut depth associated with a first cut edge of the machine and a second actual cut depth associated with a second cut edge of the machine; and determining, by the processor, a difference between one or more of a first expected cut depth associated with the first cut edge and the first actual cut depth or a second expected cut depth associated with the second cut edge and the second actual cut depth;

generating, by the processor, an instruction configured to cause the machine to perform a desired operation, based at least partly on the difference being greater than a threshold difference; and determining, by the processor and based at least partly on the difference being less than the threshold difference, an actual volume of material removed from the worksite.

2. The method of claim 1, wherein the difference is greater than the threshold difference, the method further comprising:

sending, by the processor and via the network, the instruction to the controller of the machine, wherein execution of the instruction by the controller causes the machine to perform the desired operation in near real-time.

3. The method of claim 1, wherein the desired operation comprises at least one of raising or lowering the cutting tool of the machine relative to one of a frame of the machine or the work surface.

4. The method of claim 1, wherein the second profile includes a substantially vertical cut edge defining a cut depth, and a substantially horizontal cut width, the substantially vertical cut edge and the substantially horizontal cut width being formed on the work surface by the cutting tool of the machine.

5. The method of claim 1, wherein the difference is less than the threshold difference, and determining the actual volume of material removed from the worksite is based at least partly on the second profile.

6. The method of claim 5, further comprising:

generating, by the processor and based at least partly on the actual volume of material removed, one or more reports;

causing, by the processor, at least one of the one or more reports to be displayed on a display of the computing device.

7. The method of claim 1, wherein the first information from the one or more first sensors of the machine are associated with a first location at a front end of the machine.

8. The method of claim 1, wherein the second information from the one or more second sensors of the machine are associated with a second location at a back end of the machine.

9. The method of claim 1, wherein one or more of the one or more first sensors or the one or more second sensors comprise a camera and the first information and the second information comprise image data.

10. The method of claim 1, wherein the machine comprises a cold planer, and wherein the cutting tool comprises a cutting drum that is carried by a frame of the machine and is configured to remove the material from the worksite.

11. The method of claim 1, wherein determining the actual volume of material removed from the worksite is based at least partly on sensor data from one or more machines positioned at a back end of the machine.

12. A system, comprising:

a machine disposed on a work surface of a worksite and configured to remove at least part of the work surface;

a first sensor carried by a frame of the machine and disposed at a front end of the machine, the first sensor being configured to capture first information indicative of a first profile of a first portion of the work surface proximate the front end of the machine;

a second sensor carried by the frame of the machine and disposed at a back end of the machine opposite the front end, the second sensor being configured to capture second information indicative of a second profile of a second portion of the work surface proximate the back end of the machine, the second portion of the work surface comprising a portion that has been acted on by the machine; and a processor operably connected to a display of a device, wherein the processor is configured to:

receive the first information captured by the first sensor;

generate, based at least partly on the first information, the first profile of the first portion of the work surface;

determine, based at least partly on the first profile, an estimated volume of material removed from the worksite by the machine;

receive the second information from the second sensor;

generate, based at least partly on the second information, the second profile of the second portion of the work surface;

determine, based at least partly on the second profile, an actual cut depth associated with a cut edge of the machine;

determine a difference between an expected cut depth associated with the cut edge and the actual cut depth;

determine, based at least partly on the second profile and in response to the difference being less than a threshold difference, an actual volume of material removed from the worksite by the machine; and generate, based at least partly on the actual volume of material removed, one or more reports;

cause, at least one of the one or more reports to be displayed on the display of the device; and generate an instruction configured to cause the machine to perform a desired operation, based at least partly on the difference.

13. The system of claim 12, wherein the difference is greater than a threshold difference, and wherein the desired operation comprises at least one of raising or lowering a cutting tool of the machine, the processor being further configured to:

send the instruction to a controller of the machine, wherein execution of the instruction by the controller causes the machine to perform the desired operation in near real-time.

14. The system of claim 12, wherein the processor comprises an electronic control module ("ECM") of the machine, and wherein the first sensor and the second sensor are operably connected to the processor.

15. The system of claim 12, wherein the device comprises a computing device that is remotely located from the machine or one or more servers of a remote system.

16. One or more non-transitory computer-readable storage media storing instructions that, when executed by a processor, cause the processor to perform acts comprising:
receiving, via a network, first information captured by one or more first sensors carried by a machine disposed at a worksite;
generating, based at least partly on the first information, a first profile of a work surface in front of the machine;
determining, based at least partly on the first profile, an estimated volume of material removed from the worksite by the machine;
receiving, via the network, second information captured by one or more second sensors carried by the machine;
generating, based at least partly on the second information, a second profile of a cut surface behind a cutting tool of the machine;
determining, based at least partly on the second profile, an actual cut depth associated with a cut edge of the machine; and
determining a difference between an expected cut depth associated with the cut edge and the actual cut depth;
determining, based at least partly on the second profile and the difference being less than a threshold difference, an actual volume of material removed from the worksite by the machine;
generating, based at least partly on the actual volume of material removed, one or more reports; and
generating, by the processor, an instruction configured to cause the machine to perform a desired operation, based at least partly on the difference.

17. The one or more non-transitory computer-readable storage media of claim 16, wherein one or more of the one or more first sensors or the one or more second sensors comprise a camera and the first information and the second information comprise image data.

18. The one or more non-transitory computer-readable storage media of claim 16, wherein the difference is greater than a threshold difference, the acts further comprising:
sending, via the network, the instruction to a controller of the machine, wherein execution of the instruction by the controller causes the machine to perform the desired operation in near real-time.

19. The one or more non-transitory computer-readable storage media of claim 16, wherein the desired operation comprises at least one of raising or lowering the cutting tool of the machine.

* * * * *